(12) United States Patent
Nagwanshi et al.

(10) Patent No.: US 9,731,669 B2
(45) Date of Patent: Aug. 15, 2017

(54) ENERGY ABSORBING SYSTEM

(75) Inventors: Dhanendra Kumar Nagwanshi, Bangalore (IN); Sudhakar Ramamoorthy Marur, Bangalore (IN); Gurunath PV, Chennai (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 860 days.

(21) Appl. No.: 13/407,172

(22) Filed: Feb. 28, 2012

(65) Prior Publication Data

US 2013/0221691 A1   Aug. 29, 2013

(51) Int. Cl.
    *B60R 19/02* (2006.01)
    *B60R 19/18* (2006.01)

(52) U.S. Cl.
    CPC ...... *B60R 19/18* (2013.01); *B60R 2019/1866* (2013.01); *B60R 2019/1893* (2013.01)

(58) Field of Classification Search
    CPC ... B29C 66/71; B60R 19/18; B60R 2019/186; B60R 2019/1866; B60R 21/34; B60R 19/34; F16F 7/12
    USPC ....... 293/102, 109, 120, 121, 132, 133, 134; 296/187.03, 197.04, 187.09, 187.05; 256/13.1; 180/232; 188/377; 280/751, 280/784
    See application file for complete search history.

(56) References Cited

U.S. PATENT DOCUMENTS

| 963,162 A | 7/1910 | Lund |
|---|---|---|
| 2,853,328 A | 5/1954 | Halgren |
| 6,199,937 B1 * | 3/2001 | Zetouna et al. ............... 293/136 |
| 6,406,081 B1 * | 6/2002 | Mahfet et al. ................ 293/133 |
| 6,669,251 B2 * | 12/2003 | Trappe .......................... 293/120 |
| 6,672,966 B2 | 1/2004 | Muju et al. |
| 6,726,262 B2 * | 4/2004 | Marijnissen et al. ......... 293/121 |
| 6,866,313 B2 * | 3/2005 | Mooijman et al. ........... 293/120 |
| 6,938,936 B2 * | 9/2005 | Mooijman et al. ........... 293/120 |
| 7,131,674 B2 * | 11/2006 | Evans et al. .................. 293/120 |
| 7,134,700 B2 * | 11/2006 | Evans .......................... 293/120 |
| 7,163,242 B2 * | 1/2007 | Shuler et al. ................. 293/120 |
| 7,163,243 B2 * | 1/2007 | Evans .......................... 293/121 |
| 7,222,897 B2 * | 5/2007 | Evans et al. .................. 293/120 |
| 7,278,667 B2 * | 10/2007 | Mohapatra et al. .......... 293/132 |

(Continued)

FOREIGN PATENT DOCUMENTS

| EP | 1427609 B1 | 11/2006 |
|---|---|---|
| WO | 2004099649 A1 | 11/2004 |

(Continued)

OTHER PUBLICATIONS

International Search Report; International Application No. PCT/IB2012/056902; International Filing Date: Dec. 2, 2012; Date of Mailing: Mar. 5, 2013; 6 Pages.

(Continued)

*Primary Examiner* — Kiran B Patel
(74) *Attorney, Agent, or Firm* — Cantor Colburn LLP

(57) ABSTRACT

An embodiment of a thermoplastic energy absorber for a vehicle comprises: a base and a crush lobe. The crush lobe comprises load walls extending from the base and a convex front face located at an end of the load walls opposite the base, wherein the convex front face bow outward, away from the base. The convex front face is connected to the load walls with fillets. The base and crush lobes comprise a plastic material.

16 Claims, 4 Drawing Sheets

(56) References Cited

U.S. PATENT DOCUMENTS

| | | | |
|---|---|---|---|
| 7,494,165 B2* | 2/2009 | Evans et al. | 293/102 |
| 7,533,927 B2* | 5/2009 | Ito et al. | 296/187.03 |
| 7,625,036 B2* | 12/2009 | Cormier et al. | 296/187.03 |
| 7,806,448 B2* | 10/2010 | Allen et al. | 293/120 |
| 7,857,610 B2* | 12/2010 | Rossi et al. | 425/398 |
| 7,993,725 B2* | 8/2011 | Rossi et al. | 428/100 |
| 8,016,331 B2* | 9/2011 | Ralston et al. | 293/120 |
| 8,196,979 B2* | 6/2012 | Ralston et al. | 293/121 |
| 8,348,313 B2* | 1/2013 | Chickmenahalli et al. | 293/120 |
| 2002/0149214 A1* | 10/2002 | Evans | 293/120 |
| 2004/0036302 A1* | 2/2004 | Shuler et al. | 293/120 |
| 2004/0174025 A1* | 9/2004 | Converse et al. | 293/133 |
| 2005/0230205 A1 | 10/2005 | Springler et al. | |
| 2005/0285418 A1* | 12/2005 | Evans | 293/155 |
| 2007/0187961 A1 | 8/2007 | Audi et al. | |
| 2008/0000851 A1 | 1/2008 | Pickering et al. | |
| 2008/0185851 A1* | 8/2008 | Evans et al. | 293/120 |
| 2009/0250953 A1 | 10/2009 | Perucca et al. | |
| 2010/0109353 A1 | 5/2010 | Allen et al. | |
| 2010/0326782 A1* | 12/2010 | VandenBerge et al. | 188/372 |
| 2011/0169283 A1 | 7/2011 | Salin et al. | |
| 2012/0009404 A1* | 1/2012 | He et al. | 428/218 |
| 2012/0032458 A1* | 2/2012 | Brooks et al. | 293/120 |
| 2012/0104775 A1* | 5/2012 | Marur et al. | 293/120 |
| 2012/0104778 A1* | 5/2012 | Mana et al. | 293/133 |
| 2012/0112479 A1* | 5/2012 | Nagwanshi et al. | 293/133 |
| 2012/0153643 A1* | 6/2012 | Mana et al. | 293/120 |
| 2012/0153644 A1* | 6/2012 | Bobba et al. | 293/120 |
| 2012/0153647 A1* | 6/2012 | Nagwanshi et al. | 293/132 |
| 2012/0211297 A1* | 8/2012 | Ralston et al. | 180/274 |
| 2012/0291941 A1* | 11/2012 | Czopek et al. | 156/189 |
| 2012/0304445 A1* | 12/2012 | Bobba et al. | 29/428 |
| 2013/0106139 A1* | 5/2013 | Nagwanshi et al. | 296/187.03 |
| 2013/0113226 A1* | 5/2013 | Bobba et al. | 293/133 |
| 2013/0175128 A1* | 7/2013 | Kumar et al. | 188/377 |

FOREIGN PATENT DOCUMENTS

| | | |
|---|---|---|
| WO | 2009126670 A1 | 10/2009 |
| WO | 2011057103 A2 | 5/2011 |

OTHER PUBLICATIONS

Written Opinion of the International Searching Authority; International Application No. PCT/IB2012/056902; International Filing Date: Dec. 2, 2012; Date of Mailing: Mar. 5, 2013; 7 Pages.

* cited by examiner

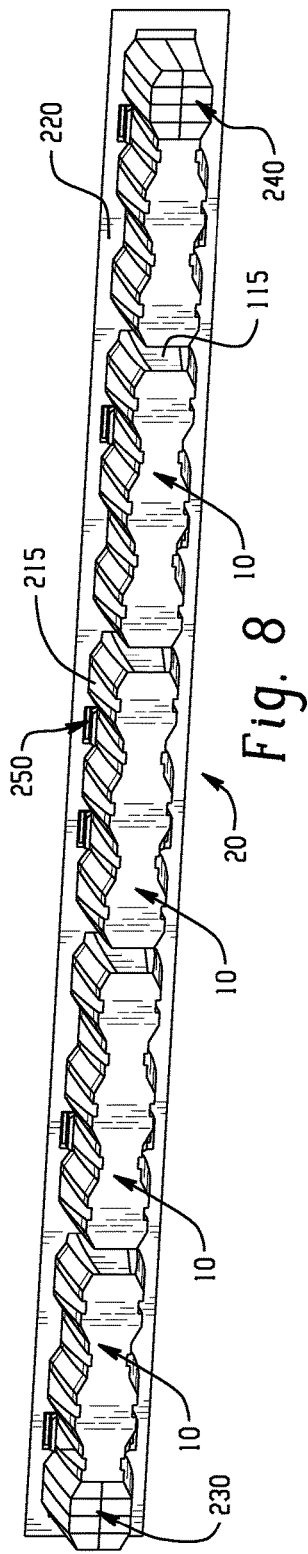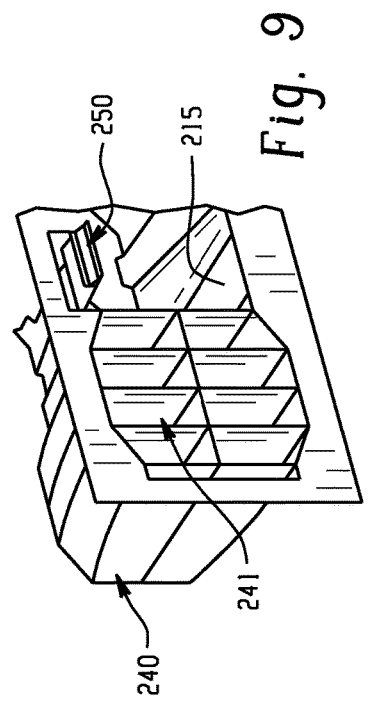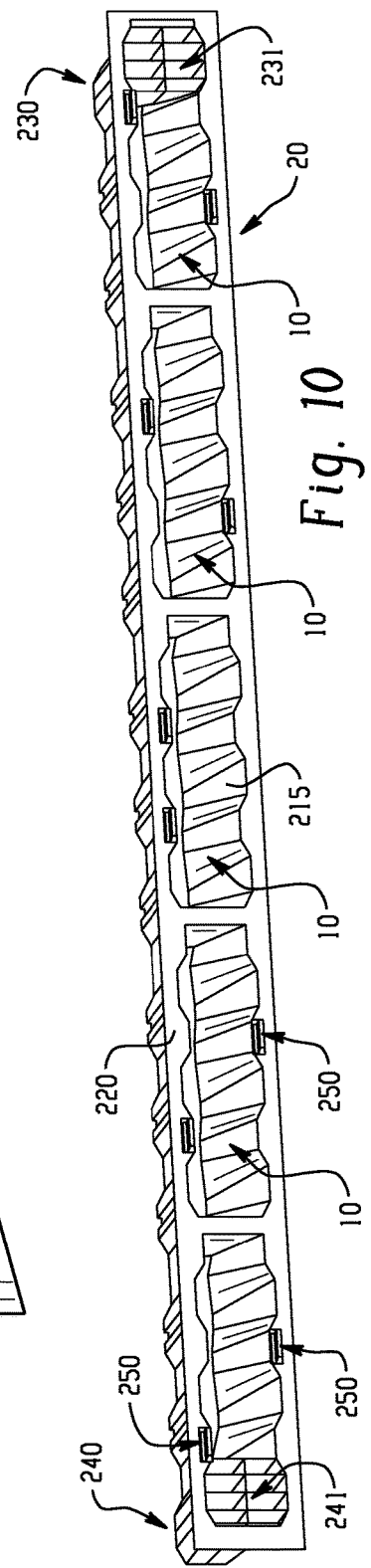

US 9,731,669 B2

ENERGY ABSORBING SYSTEM

TECHNICAL FIELD

The present disclosure relates to motor vehicle components and, in particular, to improved energy absorbing systems for a motor vehicle bumper and related components.

BACKGROUND

Modern vehicles have bumper systems tuned for particular energy absorption during a vehicle-to-vehicle impact. However, tuning of bumper systems is not easy due to the many conflicting design requirements, such as limitations on the "package space" taken up by the bumper system, limitations on bumper beam flexure and rear intrusion into the space behind the beam, and limitations on cost, quality, dimensional consistency and consistency/predictability of the impact energy-absorbing profile during the impact stroke.

Recently, there has been increasing concern and consequently regulation addressing pedestrian impacts in an effort to reduce pedestrian injury during such an impact. Such regulation has added yet another level of difficulty and complexity to bumper system design and tuning of a bumper system.

Besides safety concerns, repair costs of the vehicle and meeting government/insurance test standards, there are also other important factors in the design of vehicle parts. In particular, vehicle parts which are designed to meet government test standards, known as low speed insurance tests, whereby they withstand low speed impact, i.e., at a speed of 4 to 15 kilometers per hour (km/h; 2.5 to 9 miles per hour (mph)).

There remains a need for vehicle energy absorbers to be made of a thermoplastic material that are easily manufactured, recover their original shape after a low speed impact, lead to cost savings for repairs and collision insurance and at the same time, meet government regulation standards for pedestrian protection.

SUMMARY

Disclosed herein are motor vehicle components and, in particular, energy absorbing systems for a motor vehicle bumper and related components.

In an embodiment, a thermoplastic energy absorber for a vehicle comprises: a base and a crush lobe. The crush lobe comprises load walls extending from the base; and a convex front face located at an end of the load walls opposite the base, wherein the convex front face bow outward, away from the base. The convex front face is connected to the load walls with fillets having a radius of greater than or equal to 5 mm. The base and crush lobe comprise a plastic material.

In an embodiment, a vehicle energy absorbing system comprises: a bumper beam; an energy absorber comprising a base and a crush lobe; and a fascia covering the energy absorber, and optionally part of the bumper beam. The energy absorber comprises: a base and a crush lobe. The crush lobe comprises load walls extending from the base; and a convex front face located at an end of the load walls opposite the base, wherein the convex front face bow outward, away from the base. The convex front face is connected to the load walls with fillets having a radius of greater than or equal to 5 mm. The base and crush lobe comprise a plastic material.

The foregoing and other features will be more readily apparent from the following detailed description and drawings of the illustrative embodiments.

BRIEF DESCRIPTION OF THE DRAWINGS

The above features of the energy absorbing system for vehicle bumpers described will become apparent from the following detailed description when read in conjunction with the drawings wherein like parts are designated with like, primed reference numbers throughout in which:

FIG. 1 illustrates a C-shape element alone with a flat front face;

FIG. 8 shows an energy absorbing body having several energy absorbing elements and outboard crash boxes, one of which is shown in FIG. 9.

FIG. 10 shows a rear view of the hollow energy absorbing elements described herein;

DETAILED DESCRIPTION

The energy absorbing system for vehicle bumpers and associated elements are more particularly described in the following description and examples that are intended to be illustrative only since numerous modifications and variations therein will be apparent to those skilled in the art.

Disclosed herein is an energy absorber design configured to enhance energy absorption efficiency and reduce packaging space requirements while allowing designers higher degree of freedom. The design is configured to produce a substantially flat force versus intrusion curve (e.g., once the initial force has been applied). Desirably, the force is maintained at less than or equal to 6 kiloNewtons (kN), specifically, at less than or equal to 5.5 kN up to a 25 mm intrusion. Desirably, the force versus intrusion curve should remain flat for efficient energy absorption. An improved design employs fillets between the energy absorber convex front face and the top load wall, and between the front face and the bottom load wall. For example, a thermoplastic energy absorbing element for a vehicle can comprise: a hollow lobe protruding from a flanged base, the lobe having a flanged C-shaped cross-section, with a top load wall and a bottom load wall extending from the flanged base; and convex fillets connecting the top load wall and a font face, and the bottom load wall and the front face.

Not to be limited by theory, incorporating fillets can help reduce the initial force level at the knee of a pedestrian during vehicle-to-pedestrian impact compared to energy absorbers otherwise having the same design but with no fillets (e.g., having a sharp corner connecting the load walls and front face; in other words, no rounded corner). In addition, incorporating curvature is effective in distributing the load gradually and in a controlled manner to the top and bottom load walls, thereby reducing peak loads at displacement resulting from impact and intrusion, providing higher energy absorption efficiency.

The energy absorbing element can be formed by molding (e.g., injection molding, blow molding, and so forth), thermoforming, and combinations comprising at least one of the foregoing. Energy absorber elements as described herein may be formed of any suitable material.

As used herein "fillet" means a curvature provided at the interface of two adjacent walls. The radius of the fillet can provide fine tuning of the impact absorbed, further assisting in meeting the design constraints described herein.

Figure 1:
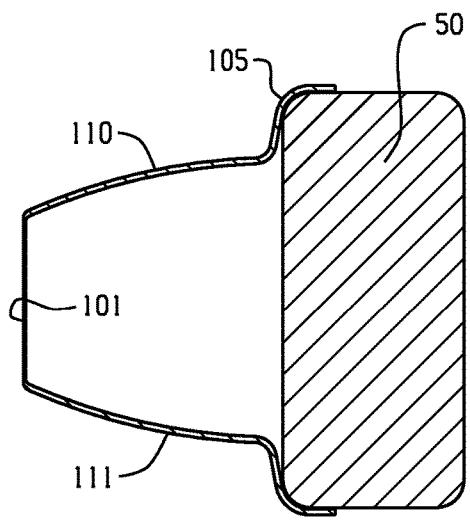
FIG. 1 shows an embodiment of the evolution of the C-shape cross section of the element, tested and shown in FIG. 11; where
Figure 2:
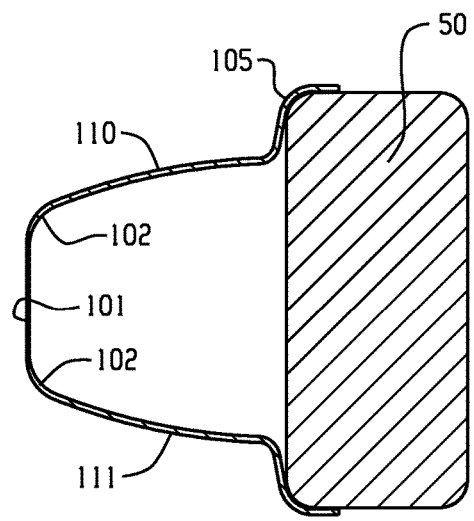
FIG. 2 illustrates a C-shape element with a flat front face and with a fillet having an increased radius (e.g., as compared to FIG. 1)

FIG. 1 illustrates a cross section energy absorbing element (10) having a flanged base (105) configured to be located in front of the vehicle bumper beam (50) (i.e., between the bumper beam (50) and a fascia (not shown)). Extending from the flanged base (105) are top load wall (110) and bottom load wall (111) which are connected by a front face (101) (e.g., a flat front face (in other words, the front face does not change in angle across the front case with respect to the beam (50))). As can be seen in FIG. 1, for a conventional energy absorber the flat front face (101) meets the load walls (110,111) with minimal curvature, e.g., only that required to enable release from the mold. Generally, the flat front face (101) meets the load walls (110,111) at a radius of less than 4 millimeters (mm). FIG. 2 illustrates an energy absorber having fillets (102) incorporated between the (e.g. flat) front face (101) and top load wall (110) and between the flat front face (101) and the bottom load wall (111). These fillets reduces the initial stiffness of the energy absorber and help to control the force versus intrusion curve such that the initial peak force is reduced, e.g., by greater than or equal to 5%, specifically, greater than or equal to 10%, and more specifically, greater than or equal to 15%, as compared to the same design energy absorber (materials, size, and geometry), except without the fillets. The fillets can have a radius of greater than or equal to 5 mm, specifically, greater than or equal to 6 mm, e.g., 5 to 10 mm.

Figure 3:
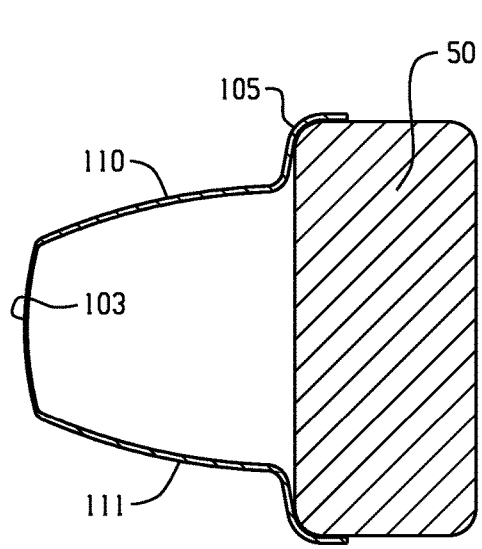
FIG. 3 illustrates a C-shape element and convex front face and without the fillet of FIG. 2.

FIG. 3 illustrates an energy absorbing system incorporating only a convex front face (103) between the top load wall (110) and the bottom load wall (111) (e.g., without the fillets of FIG. 2). Here, the outer face of the energy absorber bows outward, away from the bumper beam; e.g., it is curved from the top to the bottom.

Figure 4:
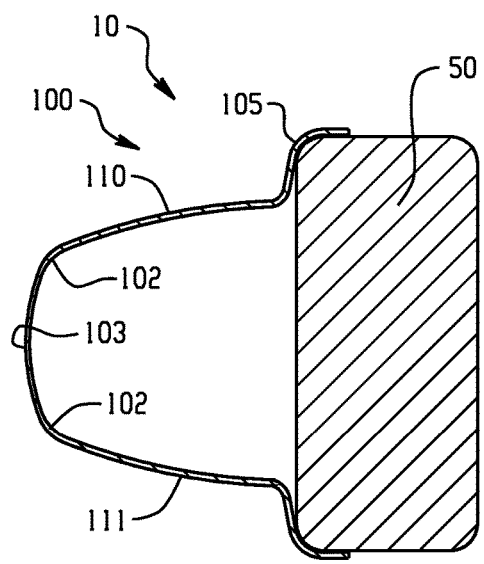
FIG. 4 illustrates a C-shape element that incorporates the fillet and the convex front face.
Figure 11:
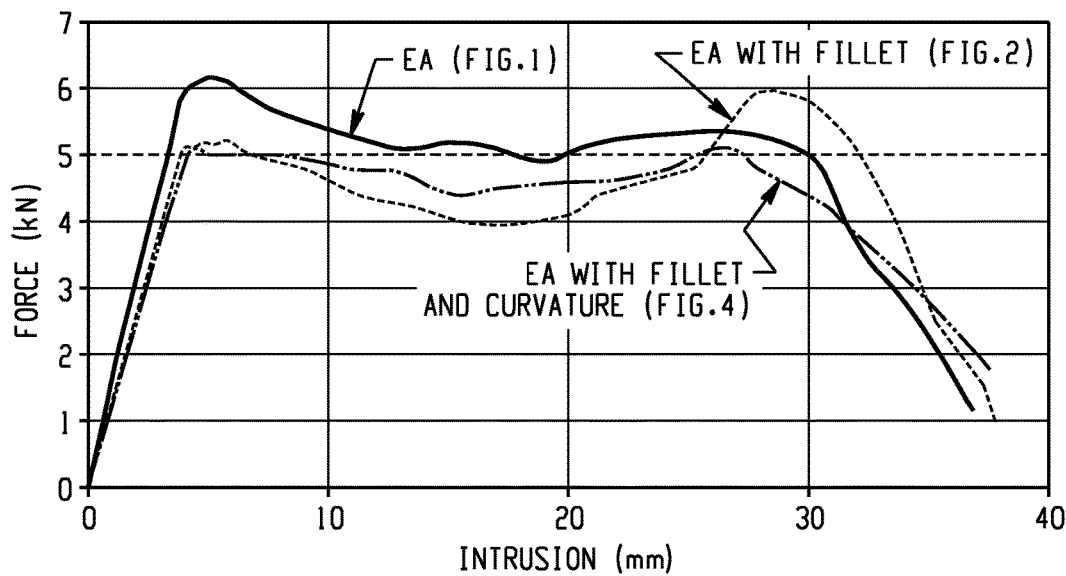
FIG. 11 shows the improvement in performance and energy absorption by incorporating fillets and curvature in C-shape energy absorbing elements.

As can be seen in FIG. 4, fillets (102) can be incorporated between the convex front face (103) and the top load wall (110) and between the front face (103) and the bottom load wall (111). Instead of a flat front face, the front face (103) can be rounded, e.g., extending outward, away from the load walls. Not to be limited by theory, incorporation of curvature in front face (103) helps in distributing the load gradually and in controlled manner to top load wall (110) and bottom load wall (111). This is illustrated by the flatter force-displacement curve as shown in FIG. 11. In other words, the fillet(s) form the intersection between the front face (101 or 103) and top load wall (110) and/or between the front face (101 or 103) and the bottom load wall (111). Not to be limited by theory, the use of fillets enables the reduction of an initial force experience by the pedestrian in an impact. The radius of the fillet may provide an additional degree of tuning the performance of the energy absorbing element (10) or energy absorbing body (20). Tuning as used herein, refers to the selection of materials and their spatial and geometrical configuration to achieve the desired properties of force-displacement characteristics described herein, while optimizing for cost, weight and packaging space or a combination comprising at least one of the foregoing.

FIG. 11 shows the improvement in performance as evident from the force vs. displacement curve observed upon impact of a lower legform with a speed of 40 km/h over a vehicle bumper equipped with energy absorber. The results show the improvement achieved by incorporating fillets (102) and a convex front face (103) cross-section (100) energy absorbing element (10) as illustrated in the curve corresponding to the energy absorbing element illustrated in FIG. 4. Incorporating fillet (102) as shown in the curve corresponding to the energy absorbing elements illustrated in FIGS. 2 and 4 has helped reducing the first peak force in the curve from 6.2 kN to 5.2 kN, and incorporation of convex front face (103) as shown in the curve corresponding to the energy absorbing element illustrated in FIG. 4 has helped to maintain flatter curve and avoid second peak of force shooting higher when the energy absorbing element (10), have fully compressed. As shown in FIG. 11 in the curve corresponding to the energy absorbing element illustrated in FIG. 1, using a cross section energy absorber alone, without convex front face (103) or fillet (102); a first peak of about 6.2 kN is observed at an intrusion of about 5 mm, yielding a curve with a slight second peak at rising above 5 kN at intrusion depth of between 20 and 28 mm. Using a C-shaped energy absorbing element (10) where the energy absorbing element (10) has only a fillet (102) as shown in the curve corresponding to the energy absorbing element illustrated in FIG. 2, shows the improvement in the energy absorber element's ability to absorb the initial impact, reducing the peak from 6.2 kN to about 5.2 kN, maintaining the displacement/force curve below 5 kN, however a sharp increase in the force is observed above 25 mm, yielding a second peak of about 5.9 kN. The advantages of the energy absorbing element described and claimed herein are evident when using a cross section energy absorber element (10) where the energy absorbing element (10) has a fillet (102), and a convex front face (103) as shown in the curve corresponding to the energy absorbing element illustrated in FIG. 4, where the energy absorbing element does not experience forces higher than 5.2 kN at any intrusion at a displacement of 6 mm and 25 mm, the forces observed do not exceed 5 kN, showing a synergistic effect of the convex front face (103) and the fillet (102) backing between the convex front face (103) and the top load wall (110); and between the convex front face (103) and the bottom load wall (111). Therefore, with the present embodiments, upon impact of a lower legform with a speed of 40 km/h over a vehicle bumper equipped with the present energy absorber, the crush lobes can experience a force of less than or equal to 5.75 kN at an intrusion from 0 to 25 mm, specifically, less than or equal to 5.5 kN at an intrusion from 0 to 25 mm, and more specifically, less than or equal to 5.25 kN at an intrusion from 0 to 25 mm. When both the fillets and convex front face are employed, upon impact of a lower legform with a speed of 40 km/h over a vehicle bumper equipped with the present energy absorber, the crush lobes can experience a force of less than or equal to 5.75 kN at an intrusion from 0 to 35 mm, specifically, less than or equal to 5.5 kN at an intrusion from 0 to 35 mm, and more specifically, less than or equal to 5.25 kN at an intrusion from 0 to 35 mm.

The energy absorbing element may be designed to have a predetermined impact resistance according to one or more factors including, but not limited to, the shape of the elements, degree of corrugation, the materials used to construct the elements, opening(s) (e.g. slots) in the load wall(s), and/or combination thereof.

Figure 5:
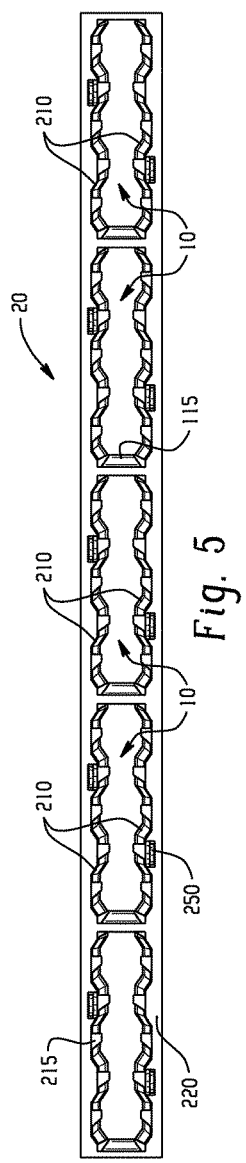
FIG. 5 shows an energy absorbing body having several energy absorber elements.
Figure 7:
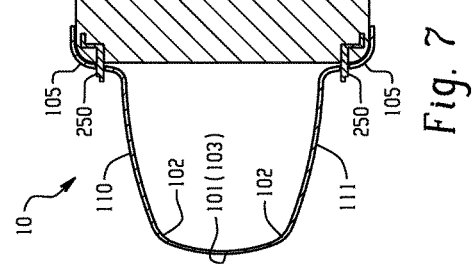
FIG. 7 shows the snap fit integration to the base of the energy absorbing element as shown in FIG. 4.

Turning now to FIGS. 5 through 10 where FIGS. 5, 8, and 10 show an energy absorbing body (20) comprising a plurality of the hollow energy absorber elements (10) protruding from a base (e.g., rectangular base) (220) of the body having at least one dimension configured to be supported by a vehicle bumper beam (50) as illustrated in FIG. 7. The plurality of energy absorbing elements may be spaced apart along the traverse axis of energy absorbing body (20). The spacing may be equal, or may vary along the major axis of energy absorbing body (20) for example, the distance between adjacent energy absorbing elements (10) may decrease from the end of the energy absorbing body (20) to the center. The change in spacing of the energy absorbing elements (10) may provide an additional tuning factor for the performance of energy absorbing body (20) upon frontal impact.

Figure 6:
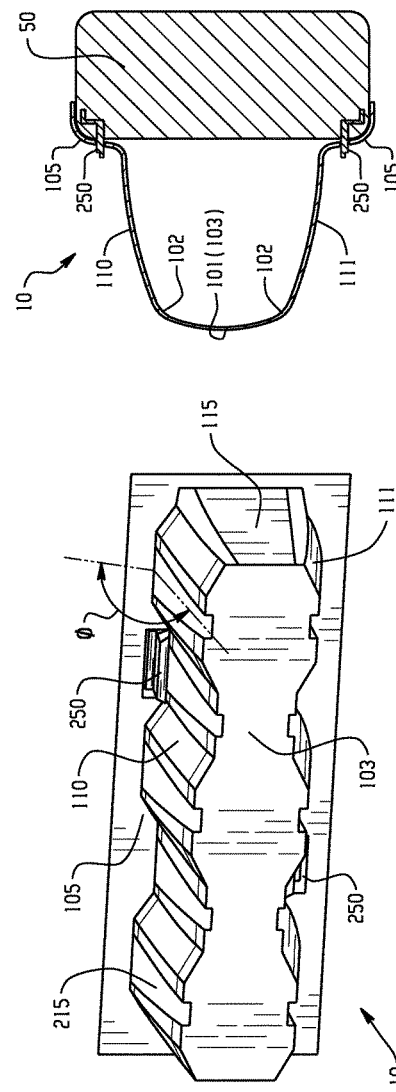
FIG. 6 shows a single energy absorber element.

FIG. 6 shows an embodiment of an energy absorber elements (10) protruding from the flanged base (105), where snap fits (250) are dispose on the energy absorbing element (10) where the top load wall (110) and bottom load wall (111) intersect the flanged base (105). As shown in FIG. 6, the top load wall (110) and bottom load wall (111) protrude from the base (105) in a manner creating an angle (φ) between the load walls and the flanged base (105). The angle (φ) defined between the load wall and the flanged base (105) can be the same or different for the top load wall (110) or the bottom load wall (111), and may vary between 90 and 145 degrees. Similarly side load wall (115) defines an angle (φ', not shown) between the side load wall (115) and the flanged base (105), which may be the same or different than the angle (φ) defined between the top load wall (110) and the base (105), or between the bottom load wall (111) and the flanged base (105) and will vary between 90 and 145 degrees. The angle defined by the load top load wall (110), the bottom load wall (111) and the side load wall (115) and energy absorbing body base (220) may vary for each energy absorbing element (or lobe) along the traverse major axis of the energy absorbing body, thus being able to provide an additional degree of fine tuning of the energy absorbing efficiency of the energy absorbing unit.

As illustrated in FIG. 6, convex front face (103) defines a sectional polygonal surface shown with three sections per energy absorbing element (10). The sectional polygonal surface may be configured to have between 1 and 16 sections, specifically, 1 to 8 sections and the like and may provide an additional tuning variable for the performance of the element. Likewise, the shape of the polygon may be changed and have between 4 sides and up to a substantially spherical or oblong shape.

As shown in FIG. 7, snap fittings (250) are integrated in the flanged base (105) of energy absorber element (10) and are configured to engage the vehicle bumper beam (50). This eliminates the need of separate fasteners to mount energy absorbing element (10) over the bumper beam (50) and helps in reducing the assembly time and assembly cost.

The size of energy absorbing elements (10) shown in FIGS. 5, 8, and 10 may be varied along the energy absorber body (20), providing a degree of curvature to the energy absorber body wherein the energy absorbed by each energy absorbing element (10) may vary as well. As shown in FIGS. 5 through 10; in order to reduce the weight of energy absorber (20), body cutaway (215) as illustrated in FIGS. 5, 6, 8, and 9 may sometimes be incorporated into the top load wall (110) and/or the bottom load wall (111) illustrated in FIG. 6, creating an opening in energy absorbing element (10), without substantially affecting the energy absorbing efficiency of the whole energy absorbing body (20). The use, size, and location of the body cutaways (215) enable further tuning of the energy absorber so as to enable the desired level of energy to be absorbed upon impact. When body cutaway (215) are incorporated into the energy absorbing body (20), the energy absorbing body (20) cannot be formed using blow molding process.

Turning now to FIGS. 8 through 10, the energy absorbing body (20) illustrated in FIG. 8, comprising energy absorber elements (10) protruding from the body base (220), and further incorporating outboard crash boxes (a left crash box (230) and right crash box (240)) disposed at opposite ends of the energy absorbing body (20). Energy absorbing body base (220) can be configured to have at least one dimension supported (e.g. backed) by a vehicle's bumper beam (50). Right crash box (230) and left crash box (240) may be configured to be stiffer than energy absorbing elements (10) disposed therebetween. Stiffer crash boxes (230, 240) may be integrated to the outboard location of energy absorbing body (20). These stiffer crash boxes may include honey comb design (e.g., rectangular honey combed columnar design (e.g. 231 and 241)) which offers beneficial energy absorption efficiency, and help in meeting 15 km/h outboard angled barrier impact requirements of the Research Council for Automobile Research (RCAR).

In other words, crash boxes (230, 240) may be further sub-divided vertically or horizontally or both vertically and horizontally, with support walls to increase the strength of crash box (230, 240), thus creating the columnar or honeycomb or other polygonal structure. The number of outboard crash box columns (231, 241) in the left and right crash boxes (230, 240 respectively) may vary. For example, the crash box can comprise 1 to 100 columns, specifically, 1 to 50 columns, and more specifically, 1 to 15 columns. Likewise, the compartments created by the support walls may be fully or partially filled such as with foam. Crash boxes (230, 240) can also vary in depth (e.g. the distance between energy body base (220) and front face (103) from the outer limit of energy absorbing body (20) towards the center (e.g. increasing in depth continuously or step-wise), providing a degree of curvature to energy absorbing body (20), and in certain instances, the size of the columns may also vary in the same direction (e.g., having an increasing surface area)).

Crash boxes (230, 240) disposed on opposite ends of the energy absorber body (20) can be formed as a single piece unitary structure and as shown in FIG. 10, and do not need separate tool for molding.

The energy absorbers can be formed by various methods such as injection molding.

Exemplary characteristics of the energy absorbing assembly include high toughness/ductility, thermal stability (e.g., −30° C. to 60° C.), high energy absorption efficiency, a good modulus-to-elongation ratio, and recyclability, among others, wherein "high" and "good" are intended to mean that the characteristic at least meets current vehicle safety regulations and requirements for the given component/element. Examples of materials that may be used to form the energy absorbing system (e.g. the energy absorbing elements and/or the outboard crash boxes) include, but are not limited to, plastic materials, metal materials, foam materials, or a combination comprising at least one of the foregoing. It may be beneficial to select a material for the front convex face (103) of the energy absorbing elements (10) that has some degree of resiliency such that in a low-speed impact, the energy absorbing element (10) does not break or exhibit permanent deformation, but rather spring back into shape after the impact force has been removed. As such, in very low speed collisions, the bumper can yield without damaging the object struck or the bumper itself.

Examples of plastic materials include thermoplastic materials as well as combinations of thermoplastic materials with elastomeric materials, and/or thermoset materials. Possible thermoplastic materials include polybutylene terephthalate (PBT); acrylonitrile-butadiene-styrene (ABS); polycarbonate (LEXAN* and LEXAN* EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX* resins, commercially available from SABIC Innovative Plastics); blends of polycarbonate/polyethylene terephthalate (PET)/PBT; polybutylene terephthalate and impact modifier (XENOY* resins, commercially available from SABIC Innovative Plastics); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite* sheets, commercially available from Azdel, Inc.); long fiber reinforced thermoplastics (VERTON* resins, commercially available from SABIC Innovative Plastics) and thermoplastic olefins (TPO), as well as combinations comprising at least one of the foregoing.

An exemplary filled resin is STAMAX* resin, which is a long glass fiber filled polypropylene resin also commercially available from SABIC Innovative Plastics. Some possible reinforcing materials include fibers, such as glass, carbon, and so forth, as well as combinations comprising at least one of the foregoing; e.g., long glass fibers and/or long carbon fiber reinforced resins. The energy absorber can also be formed from combinations comprising at least one of any of the above-described materials.

Figure 12:
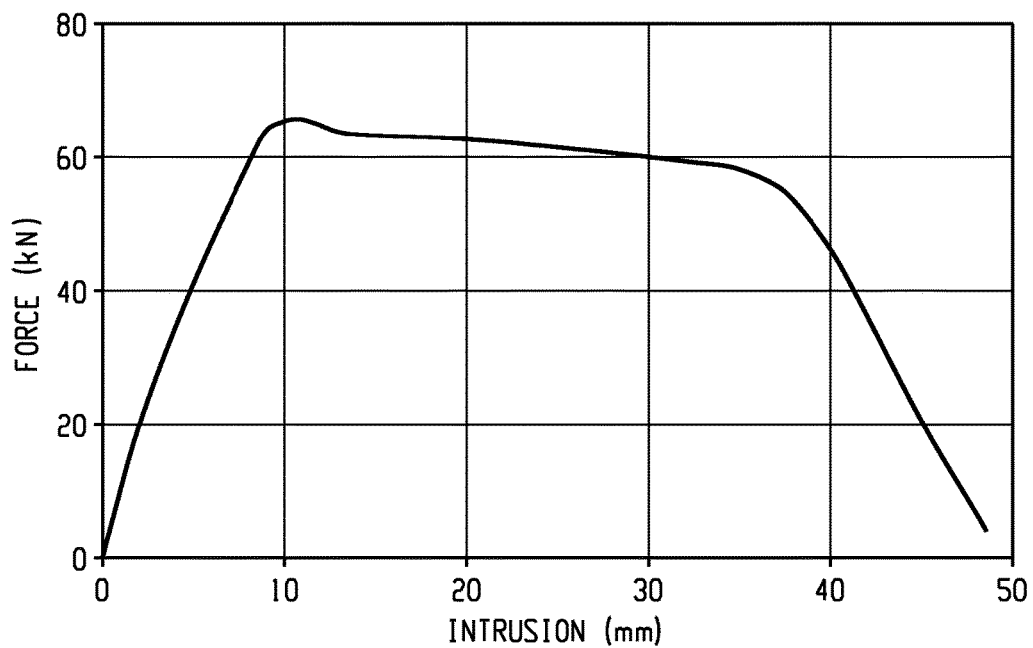
FIG. 12 shows the performance of outboard crash boxes for the 15 km/h angled rigid barrier impact.

FIG. 12 shows the performance of outboard crash boxes (230, 240) for the 15 km/h angled rigid barrier impact. Controlled crushing of rectangular honeycomb crash-can, as illustrated for the right crash box in FIG. 9, results in a flat force vs. intrusion curve and high efficiency of energy absorption. The outboard left and right crash boxes (230, 240 respectively) help in vehicle protection in corner areas and reduces insurance cost to vehicle damage during 15 kmph angled barrier hit as per the RCAR structural test protocols.

In an embodiment, a thermoplastic energy absorber for a vehicle comprises: a base and a crush lobe. The crush lobe comprises load walls extending from the base; and a convex front face located at an end of the load walls opposite the base, wherein the convex front face bow outward, away from the base. The convex front face is connected to the load walls with fillets having a radius of greater than or equal to 5 mm. The base and crush lobe comprise a plastic material.

In an embodiment, a vehicle energy absorbing system comprises: a bumper beam; an energy absorber comprising a base and a crush lobe; and a fascia covering the energy absorber, and optionally part of the bumper beam. The energy absorber comprises: a base and a crush lobe. The crush lobe comprises load walls extending from the base; and a convex front face located at an end of the load walls opposite the base, wherein the convex front face bow outward, away from the base. The convex front face is connected to the load walls with fillets having a radius of greater than or equal to 5 mm. The base and crush lobe comprise a plastic material.

In the various embodiments, (i) the base further comprises snap fittings configured to operably connect the base to a vehicle; and/or (ii) the energy absorber further comprising a pair of crash boxes disposed at opposite ends of the energy absorber; and/or (iii) the crash boxes comprise a honeycomb shape, and wherein the crash boxes have a greater stiffness than the crush lobe; and/or (iv) a force-displacement curve of the energy absorbing element upon frontal impact at 40 km/h shows a peak force of no more than 5 kN upon intrusion of 6 to 25 mm upon a frontal collision; and/or (v) upon impact of a lower legform with a speed of 40 km/h over a vehicle bumper equipped with the energy absorber, the crush lobe experiences a force of less than or equal to 5.75 kN at an intrusion from 0 to 25 mm; and/or (vi) the force is less than or equal to 5.5 kN; and/or the intrusion is from 0 to 35 mm; and/or (vii) wherein the radius is 5 to 10 mm; and/or (viii) the radius is 7 to 10 mm; and/or (ix) the radius is 5 to 7 mm.

As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A thermoplastic energy absorber for a vehicle comprising: a base; and
   a crush lobe, wherein the crush lobe comprises
     load walls extending from the base;
     a convex front face located at an end of the load walls opposite the base, wherein the convex front face bow outward, away from the base; and
     wherein the convex front face is connected to the load walls with fillets having a radius of greater than or equal to 5 mm;
   wherein the base and crush lobe comprise a plastic material.

2. The energy absorber of claim 1, wherein the base further comprises snap fittings configured to operably connect the base to a vehicle bumper beam.

3. The energy absorber of claim 1, further comprising a pair of crash boxes disposed at opposite ends of the energy absorber.

4. The energy absorber of claim 3, wherein the crash boxes comprise a honey-comb shape, and wherein the crash boxes have a greater stiffness than the crush lobe.

5. The energy absorber of claim 1, wherein a force-displacement curve of the energy absorbing element upon frontal impact at 40 km/h shows a peak force of no more than 5 kN upon intrusion of 6 to 25 mm upon a frontal collision.

6. The energy absorber of claim 1, wherein, upon impact of a lower legform with a speed of 40 km/h over a vehicle bumper equipped with the energy absorber, the crush lobe experiences a force of less than or equal to 5.75 kN at an intrusion from 0 to 25 mm.

7. The energy absorber of claim 6, wherein the force is less than or equal to 5.5 kN.

8. The energy absorber of claim 7, wherein the intrusion is from 0 to 35 mm.

9. The energy absorber of claim 6, wherein the intrusion is from 0 to 35 mm.

10. The energy absorber of claim 1, wherein the radius is 5 to 10 mm.

11. The energy absorber of claim 10, wherein the radius is 7 to 10 mm.

12. A vehicle energy absorbing system, comprising:
    a bumper beam;
    an energy absorber comprising a base and a crush lobe, wherein the crush lobe comprises load walls extending from the base; and
      a convex front face located at an end of the load walls opposite the base, wherein the convex front face bow outward, away from the base;
      wherein the convex front face is connected to the load walls with fillets having a radius of greater than or equal to 5 mm; and
      wherein the base and crush lobe comprise a plastic material; and
    a fascia covering the energy absorber and at least a part of the bumper beam.

13. The system of claim 12, wherein, upon impact of a lower legform with a speed of 40 km/h, the crush lobe experiences a force of less than or equal to 5.75 kN at an intrusion from 0 to 25 mm.

14. The system of claim 12, wherein the force is less than or equal to 5.5 kN.

15. The system of claim 14, wherein the intrusion is from 0 to 35 mm.

16. The energy absorber of claim 3, wherein the crash boxes are configured to be stiffer than energy absorbing elements disposed therebetween.

* * * * *